United States Patent [19]

Al-Mashiki et al.

[11] Patent Number: 4,849,241

[45] Date of Patent: Jul. 18, 1989

[54] NOVEL PROCESS FOR LOWERING THE CONCENTRATION OF β-LACTOGLOBULIN IN CHEESE WHEY

[75] Inventors: Shalan A. Al-Mashiki; Shuryo Nakai, both of Vancouver, Canada

[73] Assignee: The University of British Columbia, Vancouver, Canada

[21] Appl. No.: 147,364

[22] Filed: Jan. 25, 1988

[30] Foreign Application Priority Data

Jan. 26, 1987 [CA] Canada .................................. 528135

[51] Int. Cl.$^4$ ............................................ A23C 21/10
[52] U.S. Cl. ..................................... 426/583; 426/580
[58] Field of Search ................................ 426/580, 583

[56] References Cited

U.S. PATENT DOCUMENTS

| | | | |
|---|---|---|---|
| 2,710,858 | 6/1955 | Block et al. | 260/115 |
| 2,826,571 | 3/1958 | Henika et al. | 260/115 |
| 3,310,406 | 3/1967 | Webster | 426/583 |
| 3,535,304 | 10/1975 | Muller et al. | 260/120 |
| 3,882,256 | 5/1975 | DeBoer | 426/583 |
| 3,883,448 | 5/1975 | Sternberg | 252/447 |
| 3,886,300 | 5/1975 | Fujii | 426/656 |
| 3,959,249 | 5/1976 | Antonini | 260/8 |
| 4,043,990 | 8/1977 | Melachouris | 260/112 R |
| 4,225,629 | 9/1980 | Saunders et al. | 426/583 |
| 4,460,615 | 7/1984 | Furukawa et al. | 426/657 |
| 4,485,040 | 11/1984 | Roger et al. | 260/122 |
| 4,519,945 | 5/1985 | Ottenhof | 260/119 |
| 4,528,203 | 7/1985 | Harris et al. | 426/555 |

*Primary Examiner*—Donald E. Czaja
*Assistant Examiner*—Helen Pratt
*Attorney, Agent, or Firm*—Bernard, Rothell & Brown

[57] ABSTRACT

A process for lowering the concentration of β-lactoglobulin in cheese whey while retaining the immunoglobulins in said cheese whey which comprises treating said cheese whey with a polyphosphate, such as sodium hexametaphosphate, within a pH range of from about 3.8 to about 4.7.

42 Claims, No Drawings

NOVEL PROCESS FOR LOWERING THE CONCENTRATION OF β-LACTOGLOBULIN IN CHEESE WHEY

This invention relates to a novel process for lowering the concentration of β-lactoglobulin in cheese whey and more particularly, it relates to a novel process for lowering the concentration of β-lactoglobulin in cheese whey while retaining a substantial proportion of the immunoglobulins in said whey.

It is known that baby foods and infant formulas which are formulated to be sold and used instead of human milk are generally based upon cows milk or cheese whey proteins. When cheese whey is used in the preparation of such baby foods, it is desirable to remove a major portion or substantially all of the β-lactoglobulin from the cheese whey while retaining in said whey a substantial proportion of the immunoglobulin.

It is also known from U.S. Pat. No. 4,403,990, issued Aug. 23, 1977, that the total whey proteins may be separated from cheese whey by use of a multistage process consisting of treatment with a phosphate over a specified pH range to remove precipitated matter followed by treatment of the filtrate with a polyphosphate over a specified pH range to provide a second precipitate which is subsequently treated with an anionic ion exchange resin to provide a proteinaceous effluent. The protein thus prepared was to be used in preparing fortified acidic beverages. This known process removes total proteins, it does not selectively remove only β-lactoglobulin from the whey nor does it retain the immunoglobulins in the whey.

We have now found, and herein lies our invention, that a major portion of the β-lactoglobulin present in cheese whey can be selectively removed while retaining the desirable immunoglobulins in said whey by means of a treatment process using a polyphosphate at a controlled pH.

According to our invention as claimed herein we provide a process for lowering the concentration of β-lactoglobulin in cheese whey while retaining the immunoglobulins in said cheese whey which comprises treating said cheese whey with a polyphosphate within a pH range of from about 3.8 to about 4.7.

The polyphosphate to be used in the process of this invention may be selected from the group consisting of alkali metal polyphosphates, ammonium polyphosphates, phosphate glass having n from 13 to 18 wherein n is the average number of phosphorus atoms in the chain of the glassy polyphosphate, and so-called Graham's salt which is a polyphosphate well known and used by the man skilled in the trade and also commonly identified in scientific journals.

A particularly valuable polyphosphate is an alkali metal or an ammonium polyphosphate such as a hexametaphosphate. A preferred polyphosphate is sodium hexametaphosphate.

The polyphosphate to be used in this process, such as sodium hexametaphosphate, is desirably used at a concentration of from about 1.0 to about 1.7 mg/ml of the cheese whey. It is to be understood that lower or higher concentrations of polyphosphate may be used depending upon other operating conditions of the process, particularly the pH of the reaction mixture. If the pH is lower than about 3.8 or if the polyphosphate concentration is too high, other proteins besides β-lactoglobulin may be precipitated. Conversely, if the pH is above about 4.7 or the polyphosphate concentration is too low, no precipitate may be formed.

Preferred concentrations of polyphosphate to be used are usually within the range of from about 1.0 to about 1.5 mg/ml of cheese whey and especially in the range of from about 1.2 to about 1.4 mg/ml of cheese whey. When sodium hexametaphosphate is used in the process of this invention, most favourable results are obtained when it is used at a concentration of from about 1.25 to about 1.35 mg/ml of cheese whey, and especially when it is used at a concentration of from about 1.28 to about 1.33 mg/ml of cheese whey.

The pH for carrying out the process of the invention is preferably within the range of from about 4.0 to about 4.5 and more particularly within the range of from about 4.0 to about 4.3. When the polyphosphate used in the process is sodium hexametaphosphate, it has been found that a most effective pH is from about 4.0 to about 4.2 and especially at about 4.2.

The process is generally carried out at ambient temperature which may vary from about 18° C. to about 25° C. A preferred operating temperature is one within the range of from about 20° C. to about 23° C. It has been found that a particularly effective operating temperature is 22° C. When the polyphosphate used in the process is sodium hexametaphosphate and the pH is maintained at about 4.2, an effective and useful temperature is 22° C.

The process may conveniently be carried out over a period of from about 0.5 hour to about 1.5 hours and, more particularly, for a period of 0.5 hour to about 1.0 hour. The cheese whey used as starting material is preferably a sweet cheese whey such as cheddar cheese whey, swiss cheese whey or mozzarella cheese whey. It is preferred to use cheddar cheese whey as the cheese whey of choice.

The precipitated β-lactoglobulin may be removed from the residual cheese whey by any convenient means, for example by centrifugation.

As a preferred feature of the invention we provide a process for lowering the concentration of β-lactoglobulin in cheddar cheese whey while retaining the immunoglobulins in said whey which comprises treating said whey at ambient temperature with an alkali metal or ammonium hexametaphosphate with a pH range of from about 4.0 to about 4.5.

The preferred hexametaphosphate is sodium hexametaphosphate used at a concentration of from about 1.0 to about 1.4 mg/ml of the cheese whey and especially at a concentration of from about 1.28 to about 1.33 mg/ml of the whey. The pH of the mixture is preferably within the range of from about 4.0 to about 4.25 and especially from about 4.0 to about 4.2 and, more particularly, a pH of about 4.2 has been found to be most valuable. The process is usually carried out for about 30 to 60 minutes at a temperature of from about 20° C. to about 25° C., particularly at 22° C.

According to a most preferred feature of the invention we provide a process for lowering the concentration of β-lactoglobulin in cheddar cheese whey while retaining the immunoglobulins in said whey which comprises treating said cheese whey at ambient temperature with sodium hexametaphosphate used at a concentration of from about 1.25 to about 1.35 mg/ml of said cheese whey at a pH of about 4.2.

The process is desirably carried out at a temperature of about 22° C. and the treating is usually effected over a period of about 30 to 60 minutes.

When the process of this invention is operated under preferred conditions using sodium hexametaphosphate at a concentration of about 1.30 mg/ml of cheddar cheese whey and at a pH of about 4.2 at 22° C. for about 30 to 60 minutes, it is found that about 80% of the β-lactoglobulin present in the whey is removed as a precipitate. At the same time, almost all of the immunoglobulins and the major portion of the a-lactalbumins remain in the cheese whey. It has been found that approximately 90% of immunoglobulin G activity is retained in the cheese whey after treatment with sodium hexametaphosphate to remove the undesired β-lactoglobulin.

The treated cheddar cheese whey, having a lowered content of β-lactoglobulin while retaining almost all of the immunoglobulins and a major portion of the α-lactalbumins may be further treated to remove any undesired polyphosphate and the resulting whey is thereafter useful for the formulation of baby foods or infant formulas.

Thus, as a further feature of the invention, we provide a process for preparing a baby food which comprises treating cheese whey with a polyphosphate, such as sodium hexametaphosphate, within a pH range of from about 3.8 to about 4.7, especially from about 4.0 to about 4.2, to lower the concentration of β-lactoglobulin in said cheese whey while retaining the immunoglobulins in said cheese whey, removing undesired precipitated material and any excess polyphosphate from said cheese whey and thereafter using the residual cheese whey thus obtained to formulate a baby food.

The invention is illustrated by, but not limited by, the following Examples.

EXAMPLE 1

Twenty-five liters of cheddar cheese whey at 22° C. was treated with 250 ml of 10% sodium hexametaphosphate and the pH was adjusted to 4.0. The mixture was stirred for 30–60 minutes and then centerfuged at 10,000 xg for 15 minutes. The supernatant contained almost 100% of Ig with more than 45% elimination of β-lactobulin.

EXAMPLE 2

Twenty five liters of cottage cheese whey at 22° C. was treated with 280 ml of 10% sodium hexametaphosphate and the pH was adjusted to 4.13. The mixture was stirred for 30–50 minutes and the centrifuged at 10,000 xg for 15 minutes. The supernatant contained almost all immunoglobulins originally present in the cheese whey with more than 55% β-lactoglobulin elimination.

EXAMPLE 3

Twenty five liters of acid whey (whey obtained from acidified milk) at 22° C. was treated with 300 ml of 10% sodium hexametaphosphate and the pH was adjusted to 4.07. The mixture was stirred for 30–60 minutes and the centrifuged at 10,000 xg for 15 minutes. The supernatant contained almost all immunoglobulins originally present in the whey with more than 60% elimination of β-lactoglobulin.

EXAMPLE 4

Twenty five liters of cheddar cheese whey at 22° C. was treated with 320 ml of 10% sodium hexametaphosphate and the pH was adjusted to 4.0. The mixture was stirred for 30–60 minutes and then centrifuged at 10,000 xg for 15 minutes. The supernatant contained almost all immunoglobulins originally present in the cheese whey with more than 75% elimination of β-lactoglobulin.

EXAMPLE 5

Twenty five liters of cheddar cheese whey at 22° C. was treated with 320 ml of 10% sodium hexametaphosphate and the pH was adjusted to 4.20. The mixture was stirred for 30–60 minutes and then centrifuged at 10,000 xg for 15 minutes. The supernatant contained almost all immunoglobulins originally present in the cheese whey with more than 80% elimination of β-lactoglobulin.

EXAMPLE 6

Twenty five liters of cheddar cheese whey at 22° C. was treated with 320 ml of 10% phosphate glass and the pH was adjusted to 4.0. The mixture was stirred for 30–60 minutes and then centrifuged at 10,000 xg for 15 minutes. The supernatant contained almost all immunoglobulins originally present in the cheese whey with more than 75% elimination of β-lactoglobulin.

The embodiments of the invention in which an exclusive property or privilege is claimed are defined as follows:

1. A novel process for producing a modified cheese whey product, comprising:
   (a) providing cheese whey containing β-lactoglobulin and immunoglobulins;
   (b) treating said cheese whey with a polyphosphate within a pH range of from about 3.8 to about 4.7 so as to precipitate a substantial portion of said β-lactoglobulin from said cheese whey while retaining in said cheese whey a substantial portion of said immunoglobulins; and
   (c) removing the precipitate from the cheese whey so as to form a modified cheese whey product which contains a substantial portion of the immunoglobulins originally present in said cheese whey, but which is free of a substantial portion of the β-lactoglobulin originally present in said cheese whey.

2. The process of claim 1 wherein the polyphosphate is selected from the group consisting of alkali metal polyphosphates, ammonium polyphosphates, a phosphate glass having n from 13 to 18 wherein n is the average number of phosphorus atoms in the chain of the glass polyphosphate, and so-called Graham's salt as known in the art of polyphosphates.

3. The process of claim 1 wherein the polyphosphate is a hexametaphosphate.

4. The process of claim 1 wherein the polyphosphate is an alkali metal or an ammonium polyphosphate.

5. The process of claim 4 wherein the polyphosphate is a hexametaphosphate.

6. The process of claim 1 wherein the polyphosphate is sodium hexametaphosphate.

7. The process of claim 1 wherein the polyphosphate is added to the cheese whey at a concentration of from about 1.0 to about 1.7 mg/ml of cheese whey.

8. The process of claim 7 wherein the concentration is from about 1.0 to about 1.5 mg/ml of cheese whey.

9. The process of claim 7 wherein the concentration is from about 1.2 to about 1.4 mg/ml of cheese whey.

10. The process of claim 7 wherein the concentration is from about 1.25 to about 1.35 mg/ml of cheese whey.

11. The process of claim 7 wherein the concentration is from about 1.28 to about 1.33 mg/ml of cheese whey.

12. The process of claim 10 wherein the polyphosphate is sodium hexametaphosphate.

13. The process of claim 1 wherein the pH is from about 4.0 to about 4.5.

14. The process of claim 1 wherein the pH is from about 4.0 to about 4.3.

15. The process of claim 1 wherein the pH is from about 4.0 to about 4.2.

16. The process of claim 1 wherein the pH is about 4.2.

17. The process of claim 16 wherein the polyphosphate is sodium hexametaphosphate.

18. The process of claim 1 wherein the process is carried out at ambient temperature.

19. The process of claim 1 wherein the process is carried out at a temperature of from about 18° C. to about 25° C.

20. The process of claim 1 wherein the process is carried out at a temperature of from about 20° C. to about 23° C.

21. The process of claim 1 wherein the process is carried out at a temperature of about 22° C.

22. The process of claim 21 wherein the polyphosphate is sodium hexametaphosphate and the pH is about 4.2.

23. The process of claim 1 wherein the treating is maintained for a period of from about 0.5 hour to about 1.5 hours.

24. The process of claim 1 wherein the treating is maintained for a period of from about 30 minutes to about 60 minutes.

25. The process of claim 1 wherein the cheese whey is a sweet cheese whey.

26. The process of claim 25 wherein the cheese whey is cheddar cheese whey, swiss cheese whey or mozzarella cheese whey.

27. The process of claim 1 wherein the cheese whey is cheddar cheese whey.

28. A process for producing a modified cheese whey product, comprising:
 (a) providing cheese whey containing β-lactoglobulin and immunoglobulins;
 (b) treating said whey at ambient temperature with an alkali metal or ammonium hexametaphosphate within a pH range of from about 4.0 to about 4.5 so as to precipitate a substantial portion of said β-lactoglobulin from said cheese whey while retaining in said cheese whey a substantial portion of said immunoglobulins; and
 (c) removing the precipitate from the cheese whey so as to form a modified cheese whey product which contains a substantial portion of the immunoglobulins originally present in said cheese whey, but which is free of a substantial portion of the β-lactoglobulin originally present in said cheese whey.

29. The process of claim 28 wherein the hexametaphosphate used is sodium hexametaphosphate.

30. The process of claim 29 wherein the sodium hexametaphosphate is used at a concentration of from about 1.0 to about 1.4 mg/ml of whey.

31. The process of claim 29 wherein the sodium hexametaphosphate is used at a concentration of from about 1.28 to about 1.33 mg/ml of whey.

32. The process of claim 28 wherein the pH is from about 4.0 to about 4.25.

33. The process of claim 28 wherein the pH is from about 4.0 to about 4.2.

34. The process of claim 28 wherein the pH is about 4.2.

35. The process of claim 28 wherein the temperature is from about 20° C. to about 25° C.

36. The process of claim 28 wherein the temperature is about 22° C.

37. The process for producing a modified cheddar cheese whey product, comprising:
 (a) providing cheddar cheese whey containing β-lactoglobulin and immunoglobulins;
 (b) treating said whey at ambient temperature with sodium hexametaphosphate used at a concentration of from about 1.25 to about 1.35 mg/ml of said whey at a pH of from about 4.0 to about 4.2 so as to precipitate a substantial portion of said β-lactoglobulin from said whey while retaining in said whey a substantial portion of said immunoglobulins; and
 (c) removing the precipitate from the whey so as to form a modified cheddar cheese whey product which contains a substantial portion of the immunoglobulins originally present in said whey, but which is free of a substantial portion of the β-lactoglobulin originally present in said whey.

38. The process of claim 37 wherein the hexametaphosphate is used at a concentration of from about 1.28 to about 1.33 mg/ml.

39. The process of claim 37 wherein the temperature is from about 20° C. to about 25° C.

40. The process of claim 37 wherein the temperature is about 22° C.

41. The process of claim 37 wherein the treating is carried out for a period from about 30 to about 60 minutes.

42. The process of claim 37 wherein the hexametaphosphate is used at a concentration of about 1.28 mg/ml, the temperature is about 22° C. and the treating is carried out for a period of from about 30 minutes to about 60 minutes.

* * * * *